United States Patent [19]

Rhodes, deceased

[11] 4,337,787
[45] Jul. 6, 1982

[54] PRESSURE REGULATING HYDRAULIC CIRCUIT AND VALVE

[75] Inventor: Sammy J. Rhodes, deceased, late of Aurora, Ill., by The Old Second National bank of Aurora, executor

[73] Assignee: Caterpillar Tractor Co., Peoria, Ill.

[21] Appl. No.: 197,832

[22] PCT Filed: Mar. 12, 1980

[86] PCT No.: PCT/US80/00270

§ 371 Date: Mar. 12, 1980

§ 102(e) Date: Mar. 12, 1980

[87] PCT Pub. No.: WO81/02641

PCT Pub. Date: Sep. 17, 1981

[51] Int. Cl.³ .......................................... G05D 11/13
[52] U.S. Cl. .................................. 137/101; 137/118; 137/117; 91/46; 91/516; 91/517; 91/529
[58] Field of Search .................... 91/46, 516, 517, 518, 91/529, 532; 137/101, 115, 117, 118, 599

[56] References Cited

U.S. PATENT DOCUMENTS

| | | | |
|---|---|---|---|
| 3,005,463 | 10/1961 | Van Meter | 137/117 |
| 3,353,495 | 11/1967 | Bianchetta | 60/413 |
| 3,456,560 | 7/1969 | Brannon | 91/516 |
| 3,488,953 | 1/1970 | Häussler | 91/532 |
| 3,709,065 | 1/1973 | Starling | 74/753 |
| 4,057,073 | 11/1977 | Adams | 137/118 |
| 4,098,285 | 7/1978 | Karing | 137/117 |
| 4,192,337 | 3/1980 | Alderson et al. | 137/118 |
| 4,206,689 | 6/1980 | Peterson | 91/516 |

*Primary Examiner*—H. Jay Spiegel
*Attorney, Agent, or Firm*—William B. Heming

[57] ABSTRACT

For work vehicles, for example, cold weather can be a problem. Disengaging the vehicle clutch (26) aids starting by reducing engine loads during starting. Where the clutch (26) is hydraulically actuated, it can be disengaged by keeping fluid pressures below required engagement pressure when supplying other elements common to the clutch hydraulic circuit. Apparatus is provided which during starting directs fluid to, for example, pump drive bearings (20) at less than clutch engagement pressure. An input signal to the apparatus from the vehicle operator after engine start-up then builds pressure to activate the clutch (26) while continuing to supply the pump drive bearings (20) for lubrication. Upon a preselected fluid flow to the apparatus, such as at engine shutdown, the apparatus automatically returns to the condition at which available pressure levels are less than required for clutch engagement. Thus, cold starting problems are substantially eliminated by automatically providing a clutch disengaged situation in the vehicle during engine start-up.

13 Claims, 2 Drawing Figures

PRESSURE REGULATING HYDRAULIC CIRCUIT AND VALVE

TECHNICAL FIELD

The invention relates to a hydraulic circuit which controllably provides first and second preselected fluid pressure levels in the circuit to operate associated elements each requiring one of the pressure levels. More particularly, the invention relates to a hydraulic valve to automatically provide a first pressure level condition for operation of only a first means and controllably provide both first and second pressure level conditions for subsequent operation of a second means and the first means.

BACKGROUND ART

In the use of engines such as in work vehicles, starting, particularly in cold weather can be a problem. Where the engine has an associated clutch, starting can be facilitated by disengaging the clutch during start-up in order to reduce load on the engine. A clutch which is hydraulically actuated, for example, is actuated at a preset fluid pressure level supplied by a hydraulic pump usually driven by the engine itself. When the engine is shut-down, fluid can remain in the hydraulic circuit which keeps the clutch engaged or, during starting operations, turning over the engine will actuate the hydraulic pump which can supply fluid at a sufficient pressure level to engage the clutch and load the engine before the engine is fully engaged or during its warm-up period.

In some systems, it may not be possible to disengage the hydraulic pump before start-up because that pump is also used to supply other hydraulic systems, such as the drive bearings, associated with an engine driven pump. When this is the case, it is desirable to limit the maximum pressure level of hydraulic fluid from the pump to below that required for actuation of the clutch but maintain a sufficient level for other demands. It is also desirable to maintain this condition in the system for varying periods to allow for a sufficient warm-up period for the engine and to automatically disengage the clutch upon shut-down of the engine and without an external signal, such as by the operator, to prepare the engine or work vehicle for the next start-up.

The present invention is directed to overcoming one or more of the problems as set forth above.

DISCLOSURE OF INVENTION

In one aspect of the present invention, a hydraulic circuit has fluid supply means for delivering a pressurized fluid flow and first and second means operating at first and second preselected pressure levels, respectively. A main valve element has an inlet annulus positioned in fluid communication with the fluid supply means. The valve element is movable between a first position at which the inlet annulus is blocked from fluid communication with the first means and a second position at which the inlet annulus is in fluid communication with both the first and second means. Pilot means automatically communicates the inlet annulus with the first means at the first position of the valve element and initiates a condition demanding pressurized fluid flow at about the first preselected pressure level in response to a reduced fluid flow from the supply means. The pilot means also controllably initiate a condition demanding pressurized fluid flow at about the second preselected pressure level in response to a preselected input signal.

In another aspect of the present invention, a hydraulic circuit has fluid supply means for delivering a pressurized fluid flow and first and second fluid pathways which operate at first and second preselected fluid pressure levels, respectively. Means is provided for selectively, controllably directing fluid flow from the fluid supply means through the first and second fluid pathways. The means is movable toward a first position at which fluid flow is delivered through the first fluid pathway at about the first preselected pressure level in response to a reduced fluid flow and movable toward a second position at which fluid flow is delivered at about the first and second preselected pressure levels through the first and second fluid pathways, respectively, in response to a preselected input signal.

In still another aspect of the present invention, a valve has main valve and pilot valve elements. The main valve element has a spool movable in a bore between first and second positions. At the first position, an inlet annulus of the valve element is blocked from communication with an outlet annulus of the valve element. At the second position, the inlet annulus is positioned in communication with the outlet annulus. First biasing means is provided for urging the spool toward its first position. A pilot valve element also has a spool movable in a bore between a first position at which a second supply annulus of the pilot valve element is positioned in communication with a third annulus of the pilot valve element and blocked from communication with a first annulus of pilot valve element and a second position at which the second annulus is in communication with the first annulus and blocked from communication with the third annulus. The second and third annuli are in communication with the inlet annulus and outlet annulus respectively, of the main valve element. Bleed means is provided for controllably relieving the second annulus at the second position of the pilot valve element.

The above-described hydraulic circuits and valve can be used to, for example, assist starting of an engine by unloading an associated clutch. The clutch can be automatically unloaded after engine shut-down by reducing hydraulic fluid pressure to the clutch to below its actuation or engagement pressure. This maintains the engine at an unloaded condition for the next start-up while maintaining fluid flow to other hydraulic circuits. Following starting and a warm-up period the necessary actuation pressure can be initiated to the clutch by a signal from the operator.

BEST MODE FOR CARRYING OUT THE INVENTION

Figure 1:
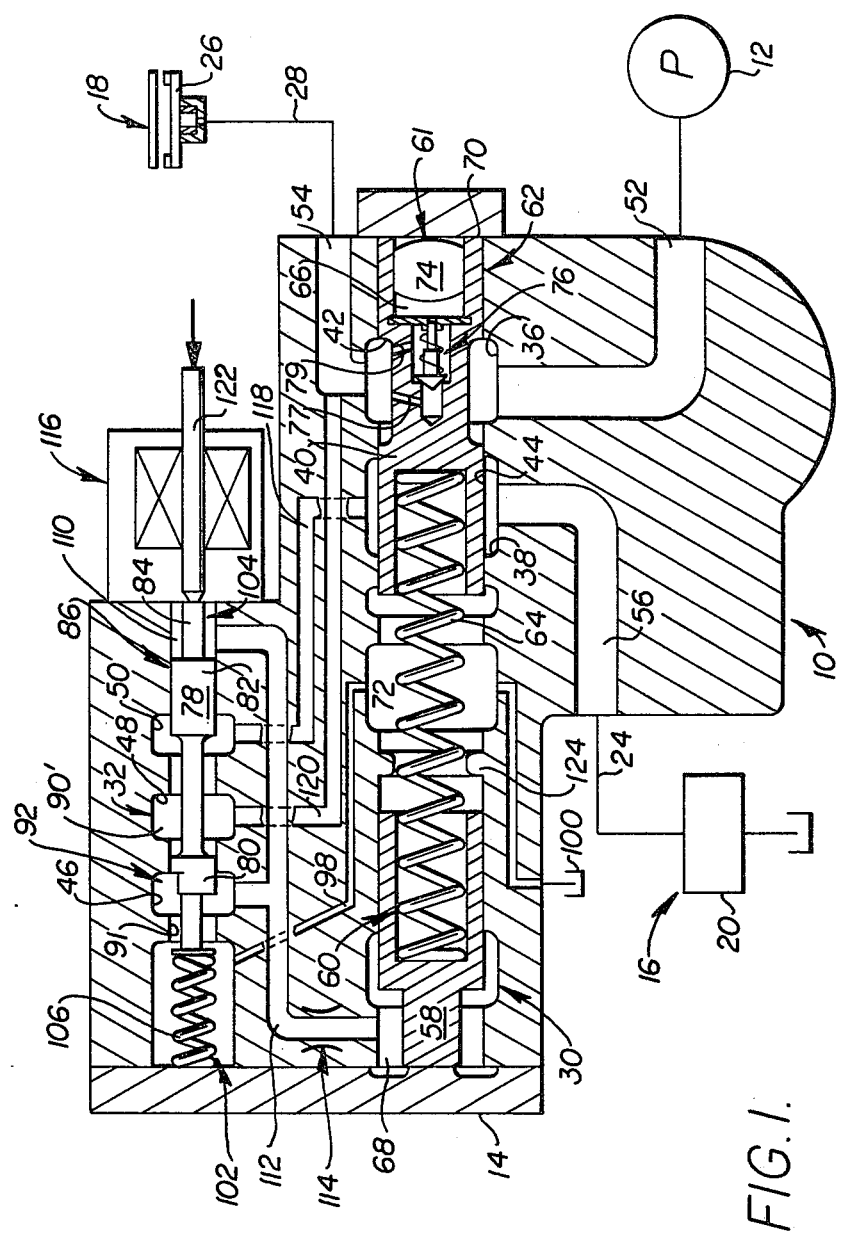
FIG. 1 is a diagrammatic view of one embodiment of the present invention, shown as a valve in partial cross section and at a first operating position, associated with a lubrication system and clutch of an engine.

Referring to the drawings, a hydraulic circuit 10 is shown which includes a fluid supply means or supply pump 12 for delivering a pressurized fluid flow, a valve 14 and first and second means 16,18 which operate at first and second preselected fluid pressure levels, respectively. The first means 16 represents a work element such as the pump drive bearings 20 of a main hydraulic pump associated with an engine of a work vehicle (not shown). The drive bearings are connected to the supply pump through the valve by, a first fluid pathway 24. The second means 18 similarly is represented by a work element such as a clutch 26 which has, and is connected to the pump through the valve by, a second fluid pathway 28. Fluid delivered from the pump during operation of the engine will therefore be delivered through the valve to the clutch and pump drive bearings.

As is known in the hydraulic art, the first fluid pathway 24 from the pump 12 maintains or creates a particular or first preselected resistance to fluid flow at the pump which determines the pressure level at which fluid is delivered from the pump and through the pathway to lubricate the engine. The first preselected pressure level related to the first preselected resistance is established by the configuration of the pathway through which the fluid flows. Similarly, the second fluid pathway 28 determines a second preselected fluid pressure level relative to a second preselected resistance to fluid flow which, in this instance, is characterized by the actuation pressure at which the clutch becomes engaged in response to the set fluid pressure level. The valve controls the fluid pressure levels in the hydraulic circuit, as will be discussed hereinafter, to lubricate the pump drive bearings and provide engagement pressure to the clutch when desired.

As above described, the valve 14 essentially represents means movable between first and second positions for selectively, controllably directing fluid flow from the pump 12 through the first and second fluid pathways 24,28. At the first position of the means (shown in FIG. 1), toward which it is automatically movable, the first fluid pathway is in fluid communication with the pump 12 and fluid flow is delivered at about the first pressure level in response to a reduced fluid pressure level relative to the second pressure level. Briefly, this represents the situation where the associated engine is shut down, for example, and the lack of fluid flow from the pump results in the valve automatically adjusting to provide, and maintain until signalled, disengagement of the clutch. The means is movable toward the second position (shown in FIG. 2) in response to a preselected input signal. At the second position, the first and second fluid pathways 24,28 are both in fluid communication with the supply pump and fluid is delivered through each at their respective related first and second preselected pressure levels. Again briefly, this marks the situation where starting and warm-up of the engine have been accomplished and the operator has activated the clutch by signalling the valve, as will be further explained.

Referring now more particularly to the construction of the valve 14, said valve consists of a pressure regulating valve means or main valve element 30 and pilot means 32, such as a pilot valve element 34. The main valve element is a modulating spool valve assembly which has an inlet annulus 36, an outlet annulus 38 and a spool 40. The spool has a groove 42 and is movable in a bore 44 of the valve element. The pilot valve element includes first, second and third fluid supply annuli 46,48,50 and is positioned in fluid communication with the inlet annulus through its second annulus and with the outlet annulus through its third annulus. As will be explained, each of the valve elements is movable between respective, related first (shown in FIG. 1) and second (shown in FIG. 2) positions to determine the pressure level of the fluid flow from the pump 12 to the lubrication system 20 and the clutch 26.

The inlet annulus 36 of the main valve element 30 is in communication with the pump 12 and the clutch 26 through and as a portion of the second fluid pathway 28. Passageways 52,54 in the valve 14 also represent a portion of the second fluid pathway. The outlet annulus 38 connects the main valve element to the pump drive bearings 20 by being positioned in communication with said system. The outlet annulus 38 also forms a portion of the first fluid pathway as does another passage 56 in the valve and the passage 52.

In further detail, the main valve element 30 has a load piston 58 and biasing means 60 for urging the spool 40 toward a first position 62 which corresponds with the first position of the main valve element. Also, pilot pressure means 61 is provided for urging the main valve element towards its second position 63 and against the biasing means. The biasing means 60 is shown as a spring 64 located between the load piston and the spool in the bore 44. The pilot pressure means is a first pilot chamber 66. The first pilot chamber 66 and a second pilot chamber 68, defined in the bore and by the spool and load piston, respectively, are associated with first and second ends 70,72 of the spool, respectively. A reaction slug 74 and check valve 76 are positioned in the first pilot chamber which is in fluid communication with the inlet annulus 36 through passageways 77,79 in the valve. It will be readily seen that movement of the spool depends upon the fluid pressure level in the pilot chambers which will work against the spring tending to move the spool or alter the effective rate of the spring.

The pilot valve element 34 has a spool 78 consisting of first and second lands 80,82 interconnected to a stem 84. The spool is movable in the bore between first and second positions 86,88 which correspond to the first and second positions of the pilot valve element. The spool portions are spaced one from the other to define a moving work chamber 90' (FIG. 1), 90" (FIG. 2) within a bore 91 of the element. At the first position of the spool, therefore, the second supply groove 48 of the pilot valve element is in communication with the third groove 50 and blocked from communication with the first supply groove 46 to define the work chamber 90' of FIG. 1. At the second position, the second supply groove is in communication with the first supply groove and blocked from communication with the third supply groove to define the work chamber 90" of FIG. 2. Also, at the second position, bleed means 92 is provided for automatically, controllably reducing or relieving the fluid pressure level in the work chamber, and thus the second fluid pathway 28. The bleed means is shown as a notch 94 of predetermined configuration on the first land which meters the fluid from the work chamber across the first land and through a drain passageway 98 to tank 100.

To control movement of the pilot valve element 34 in cooperation with the bleed means 92, said valve is provided with biasing means 102 for continuously urging the pilot valve element toward its first position (FIG. 1) and pilot pressure means 104 for controllably urging the pilot valve element against said biasing means and toward its second position. The biasing means is a spring 106 acting against the stem 84 adjacent the first land 80 of the pilot valve element. The pilot pressure means is a chamber 110 defined by the bore 91 and the second land 82 and positioned in communication with the first supply annulus 46 and the second pilot chamber 68 through a passageway 112 in the valve 14. An orifice 114 meters fluid entry from the pilot valve element into the second pilot chamber. A solenoid 116, preferably manually operated, is operable against the stem 84 adjacent the second land to provide a preselected input signal to the pilot valve element for moving it towards its second position as hereinafter described.

It should be understood that the hydraulic circuit 10 and particularly the valve 14 and its individual components can be of other configurations as is known in the art without departing from the present invention.

INDUSTRIAL APPLICABILITY

In the operation of the engine 22, starting can be a problem, particularly in cold weather. The valve 14 automatically positions itself in order to disengage the hydraulically operated clutch 26 when the associated engine is shut-down for releasing the load on the engine caused by the engaged clutch. Therefore, when starting is next attempted the engine will be free from the clutch load and easier to turn-over. The valve also maintains fluid flow to the main hydraulic pump drive bearings so that upon start-up fluid is immediately pumped thereto for lubrication purposes.

Beginning at a point at which the engine is shut-down and the clutch de-energized, the operation of the hydraulic circuit 10 will now be discussed in more detail. Referring to FIG. 1, the spools 40,78 are in their first positions 62,86 which correspond to the first positions of their related main and pilot valve elements 30,34. At said positions, the inlet annulus 36 is positioned in fluid communication with the pump drive 20 through the pilot valve element. Upon turning the engine over for starting, pressurized fluid will flow from the pump 12 and through the main valve element and the pilot valve element and back to the main valve element by way of passageways 118,120 interconnecting the main and pilot valve elements. The inlet annulus 36 of the main valve element is also positioned in fluid communication with the clutch at the first position of FIG. 1 and fluid will pass through the passageway 54 to the clutch.

The pressure level at which fluid flows from the pump 12 at start-up is the first preselected pressure level, as established by the first fluid pathway 24 and, in part, by the pathway through the valve, owing to the associated first preselected resistance being less than the second preselected resistance established in the circuit 10 by the clutch. In the embodiment shown, this is particularly evident owing to the significant differences in pressure levels at which a lubrication system and clutch, typically 20-50 psi and 200 psi, respectively, operate. The fluid flowing through the valve 14 in FIG. 1 will therefore not be sufficient to actuate the clutch to load the engine nor will fluid which enters the first pilot chamber 66 be of a sufficient pressure level to overcome the spring 64 to move the spool 40 from its first position 62. The check valve 76 acts as a dampening device for the fluid which enters the relatively large passageway 77 compared to the exit pathway 79.

As is evident from the drawings, the hydraulic circuit 10 remains in the fluid flow configuration of FIG. 1 absent an external signal. Following successful starting of the engine 22 and a warm-up period if desired, the operator delivers such an input signal to the pilot valve element 34 by moving a rod 122 of the solenoid 116 against the pilot valve element stem 84. This can be done manually or electrically. The pilot valve element is thereby moved to its second position, shown in FIG. 2, in response to the preselected signal for controllably initiating a condition in the circuit 10 demanding fluid flow at about the second preselected pressure level. In other words, the pilot valve element is signalled to alter the hydraulic circuit, as will be further explained, to make the pump work against the higher second preselected resistance to fluid flow. Against the higher resistance, the pump will deliver fluid at the higher second fluid pressure level to activate the clutch. It should be noted that once the pilot valve element is moved to its second position, the operator releases the solenoid rod and biasing means, such as springs (not shown), will return it to its neutral or disengaged position.

Figure 2:
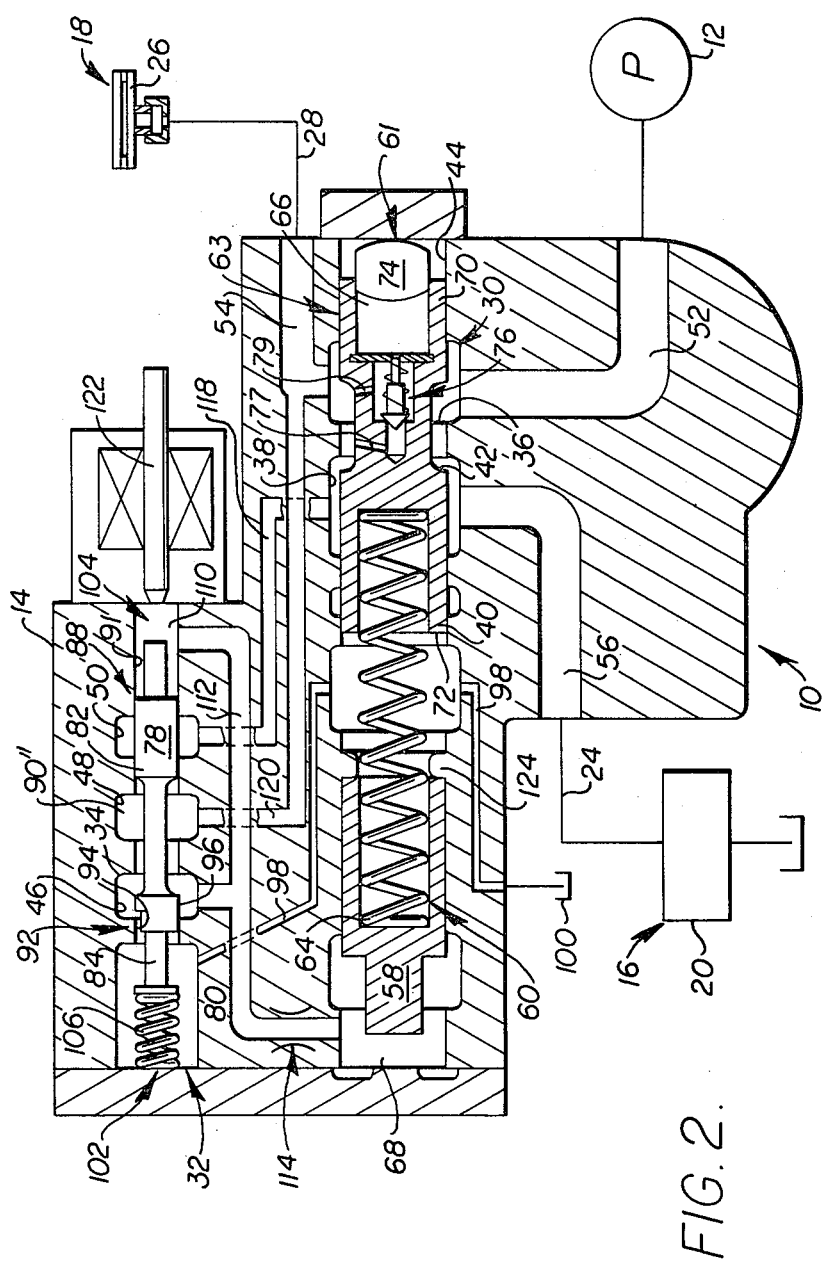
FIG. 2 is a diagrammatic view of the valve similar to FIG. 1 shown in a second operating position.

With the pilot valve element 34 moved toward its second position, the inlet annulus 36 is blocked from fluid communication with the lubrication system through the pilot valve element and the chamber 110 is positionable in fluid communication with the inlet annulus 36 through the new work chamber 90''. In FIG. 2, at the second position of the pilot valve element, therefore, fluid pressure begins to build in the passageways 112,120 to about the second preselected pressure level as the chambers 68,110 fill with fluid. The main valve element 30 is now movable toward its second position which is shown in FIG. 2 in response to the fluid pressure being at about the second preselected pressure.

The main valve element 30 is moved to its second position as the fluid pressure acts against the slug 74 in the first pilot chamber 66 to move the spool 40 toward its second position in FIG. 2. However, pressure will also build toward the second pressure level in the first pilot chamber 68 tending to move the load piston 58 against a stop 124 on the bore. The load piston movement upstages the force of the spring 64 which works against a similar pressure build-up in the first pilot chamber to move the pressure level to second preselected pressure level.

At the second position 40 of the spool 80, the supply annulus 42 is opened into communication with the outlet annulus 38 and provides sufficient fluid at the second pressure level to actuate the clutch 26 and to provide lubricating fluid to the engine 22 at the first preselected pressure level. However, if the pressure level relative to the second preselected pressure level drops across the main valve element 30, the spool will move back toward its first position shutting off the pathway through the supply annulus. The main valve element is then movable from its second toward its first position of FIG. 1 in responsive to the reduced fluid flow at the lower pressure level. This results in a modulation of fluid across the communicating areas of the supply and outlet annuli where the pressure level again rises and the main control valve moves from its first back toward its second position at the newly established second preselected pressure level.

Where the fluid supply is completely blocked off, such as at shut-down of the engine 22, the main control valve 30 will move back toward its first position of FIG. 1 and would normally maintain substantially the second preselected pressure level through the second fluid pathway to keep the clutch 26 actuated. At this point, however, the notch 94 in the pilot valve element 34 bleeds off the fluid at the second pressure level, as it does during operation of the engine. As the pressure level drops below the second preselected pressure level, the clutch is deactivated and the pilot valve is movable from its second toward its first position of FIG. 1. owing to the biased action of the spring 106. The main valve element 30 then moves to its first position at the first position of the pilot valve element 34 and a condition is initiated in the circuit 10 demanding fluid flow at the first preselected pressure level, as previously explained. Thus, the valve 14 upon shut-down of the engine automatically deactivates the clutch to unload the engine in preparation for later re-starting of the engine. This substantially eliminates problems associated with de-energizing the clutch in preparation for starting the engine and with starting the engine against the high loads placed thereon by an energized clutch.

Other aspects, objects and advantages will become apparent from a study of the specification, drawings and appended claims.

I claim:

1. A hydraulic circuit (10), comprising:
   fluid supply means (12) for delivering pressurized fluid flow;
   first and second means (16,18) for operating at first and second preselected fluid pressure levels of fluid flow thereto, respectively, said first preselected pressure level being less than said second preselected pressure level;
   first and second fluid pathways (24,28) establishing fluid flow from said fluid supply means (12) to said first and second means (16,18), respectively;
   a main valve element (30) having a bore (44), a spool (40) and inlet and outlet grooves (36,38), said spool (40) being movable in said bore (44) from a first (62) toward a second (63) position in response to fluid pressure in said second fluid pathway (28) being at said second preselected pressure level and from said second (63) toward said first (62) position in response to fluid pressure in said second fluid pathway (28) being at a reduced pressure level relative to said second preselected pressure level, said inlet groove (36) being positioned in fluid communication with said fluid supply means (12) and, at said first and second positions (62,63), in controlled fluid communication with said outlet groove (38) through said first and second fluid pathways (24,28), respectively, said outlet groove (38) being positioned in fluid communication with said first means (16); and
   pilot means (32) for automatically initiating a fluid pressure level at less than said second preselected pressure level in said second fluid pathway (28) and opening said first fluid pathway (24) to fluid flow in response to fluid flow being blocked from said fluid supply means (12) into said second fluid pathway (28) and for simultaneously blocking fluid flow through said first fluid pathway (24) and initiating fluid flow through said second fluid pathway (28) in response to a preselected input signal, said pilot means (32) including a pilot valve element (34) movable between a first position at which said inlet groove (36) is positioned in fluid communication with said outlet groove (38) through said pilot valve element (34) and a second position at which said inlet groove (36) is blocked from fluid communication with said outlet groove (38) through said pilot valve element (34).

2. The hydraulic circuit (10), as set forth in claim 1, wherein said inlet groove (36) of said main valve element (30) is positioned in fluid communication with second means (18) at said first position of said spool (40).

3. The hydraulic circuit (10), as set forth in claim 1, wherein said pilot valve element (34) has bleed means (92) for automatically, controllably reducing said fluid pressure level in said second fluid pathway (28) at said second position of said pilot valve element (34).

4. The hydraulic circuit (10), as set forth in claim 3, wherein said pilot valve element (34) is movable from said second toward said first position in response to said bleed means (92) reducing said fluid pressure level in said second fluid pathway (28) to below the second preselected pressure level.

5. The hydraulic circuit (10), as set forth in claim 1, wherein said pilot valve element (34) has biasing means (102) for continuously urging said pilot valve element (34) toward said first position of said pilot valve element (34) and pilot pressure means (104) for controllably urging said pilot valve element (34) against said biasing means (102) and toward said second position of said pilot valve element (34).

6. The hydraulic circuit (10), as set forth in claim 5, wherein said pilot pressure means (104) includes a chamber (110) positionable in fluid communication with said second fluid pathway (28) in response to said pilot valve element (34) moving toward said second position of said pilot valve element (34).

7. The hydraulic circuit (10), as set forth in claim 6, wherein said pilot valve element (34) has first, second, and third fluid supply grooves (46,48,50), said first fluid supply groove (46) being positioned in fluid communication with said chamber (110) of said pilot pressure means (104), said second fluid supply groove (48) being positioned in fluid communication with said inlet groove (36) and said second means (18), said third fluid supply groove (50) being positioned in fluid communication with said outlet groove (38).

8. The hydraulic circuit (10), as set forth in claim 7, wherein said first and second fluid supply grooves (46,48) are positioned in fluid communication one to the other and blocked from fluid communication with said third fluid supply groove (50) at said second position of said pilot valve element (34) and said second and third fluid supply grooves (48,50) are positioned in fluid communication one to the other and blocked from fluid communication with said first fluid supply groove (46) at said first position of said pilot valve element (34).

9. The hydraulic circuit (10), as set forth in claim 1, including a solenoid (116) positioned at a location sufficient for moving said pilot valve element (34) toward said second position of said pilot valve element (34) for delivering said preselected input signal.

10. The hydraulic circuit (10), as set forth in claim 1, wherein said main valve element (30) has pilot pressure means (61) for urging said spool (40) toward said second position of said spool (40) in response to said second preselected pressure level.

11. The hydraulic circuit (10), as set forth in claim 10, wherein said pilot pressure means (104) includes a chamber (110) positioned in fluid communication with said inlet groove (36) of said main valve element (30).

12. A valve (14), comprising:
    a main valve element (30) having a bore (44), a spool (40), fluid inlet and outlet grooves (36,38) and first and second pilot chambers (66,68), said spool (40) having first and second ends (70,72) and being movable in said bore (44) between a first position (62) at which said inlet groove (36) is blocked from communication with said outlet groove (38) and a second position (63) at which said inlet groove (36)

is positioned in communication with said outlet groove (38), said first pilot chamber (66) being associated with said first end (70) and positioned in communication with said inlet groove (36), said second pilot chamber (68) being associated with said second end (72);

first biasing means (60) for urging said spool (40) toward said first position (62) of said spool (40);

a pilot valve element (34) having a bore (91), a spool (78), a pilot chamber (110) and first, second and third fluid supply grooves (46,48,50), said pilot chamber (110) being in communication with said second pilot chamber (68) of said main valve element (30), said spool (78) being movable in said bore (91) between a first position (86) at which said second supply groove (48) is in communication with said third groove (50) and blocked from communication with said first supply groove (46) and a second position (88) at which said second supply groove (48) is in communication with said first supply groove (46) and blocked from communication with said third supply groove (50), said first supply groove (46) being in communication with said pilot chamber (110) and said second pilot chamber (68) of said main valve element (30); said second supply groove (48) being in communication with inlet groove (36) of said main valve element (30), said third supply groove (50) being in communication with said outlet groove (38) of said main valve element (30);

second biasing means (102) for biasing said pilot valve element (34) toward said second position of said pilot valve element (34); and bleed means (92) for controllably relieving said second fluid pathway (28) at said second position of said pilot valve element (34).

13. The valve (14), as set forth in claim 12, wherein said spool (40) has a supply groove (42) positioned in communication with said inlet and outlet grooves (36,38) of said main valve element (30) at said second position of said main valve element (30).

* * * * *